UNITED STATES PATENT OFFICE.

GILBERT S. DEAN, OF SAN FRANCISCO, CALIFORNIA.

IMPROVEMENT IN THE MANUFACTURE OF CEMENT AND ARTIFICIAL STONE.

Specification forming part of Letters Patent No. 122,880, dated January 23, 1872.

*To all whom it may concern:*

Be it known that I, GILBERT S. DEAN, of the city and county of San Francisco, State of California, have invented Improvements in Artificial Stone and Cement; and I do hereby declare the following description and accompanying drawing are sufficient to enable any person skilled in the art or science to which it most nearly appertains to make and use my said invention or improvements without further invention or experiment.

My invention relates to a new and useful combination of ingredients, whereby I am enabled to produce a strong and durable cement, which can be employed for any of the various purposes for which cement or mortar is ordinarily used. This cement when left exposed to the atmosphere a proper length of time will harden and form a beautiful artificial stone of great durability.

I mix together clay, whether in the raw or calcined state, or any silicious or aluminous material in a state of fine division—such as powdered quartz, sinter, feldspar, ashes, &c.—with from one-fourth or one-sixth its bulk to one and a half or twice its bulk of lime or carbonate of lime and add to the mixture from one per cent. to twelve per cent. of potash, soda, or the carbonates of these alkalies or baryta, or a mixture of two or more of these materials, or any substance or mixture which will yield them or any of them.

This is the simplest method of making a mixture which will produce a petrifaction under my process. The varying proportions of materials given above are rendered necessary by the varying qualities of the clays, limestones, and other minerals from different localities, and even of materials from the same locality; and also by the fact that it is necessary to produce different kinds of petrifactions for different purposes. An exact rule, therefore, which will suit all circumstances and all materials cannot be given. An excess of lime is to be avoided, as it is injurious. An excess of alkali or baryta, on the other hand, does no harm, as the excess of alkali crystallizes out on the surface of the stone in the form of carbonate when its interior work is done, and may be easily removed by scraping, sweeping, or by immersing the stone in hot water, while the excess of baryta either forms a carbonate, or more commonly (when the finishing solutions are used) a sulphate, by combining with the sulphuric acid of the alum used in finishing, and so becomes solid, insoluble, and inert.

I have given the simplest method of forming my mixture, in order that the principle may be fully understood. In practice, however, I resort to the following more complex methods.

First, for some cements and petrifactions I mix clay with a variable proportion of lime or carbonate of lime, or a mixture of these two substances, the amount of lime being generally between thirty (30) and fifty (50) per cent. of the amount of the clay, and I add to this mixture a variable amount, generally from two to five per cent. of potash, soda, or baryta, or a mixture of two or more of these ingredients.

Second, more commonly I add to the clay some crushed or ground silicious material, such as those mentioned above, or any silicious material which may be conveniently at hand. The proportion of silicious material added varies with its character and that of the clay, as well as with the use for which the cement or petrifaction is designed; but it is commonly nearly the same in amount as the clay used. To this mixture the potash, soda, or baryta, or mixture of two or more of these ingredients is added, as before described. Likewise the lime or carbonate of lime or mixture of these.

Third, where the color of oxide of iron or iron ore is desired, I frequently add to the clay, or to the mixture of clay and silicious material, a proportion of this material rarely or never exceeding twenty-five (25) per cent. of the mass; lime, potash, soda, baryta, as usual; but where the iron ore or oxide of iron is used in large proportion the lime may be reduced in quality or even omitted entirely. The iron ore or oxide of iron is not added simply for the purpose of giving color, but specially for the purpose of forming a silicate of iron, and thus adding to the solidity and durability of the cement or stone.

Fourth, where a suitable clay is not obtainable, or where a porous stone is desired, or where, from any cause, it is found advantageous to omit the use of clay in the preparation of the cement or stone, a mixture is prepared of ground or crushed silicious materials, lime or carbonate of lime, or a mixture of these materials, potash, soda, or baryta, or a mixture of two or more of these ingredients; and, if expedient, some iron ore or oxide of iron, and with this mixture petrifaction ensues in the usual time, (from three to six weeks generally.)

Fifth, when lime or its carbonate is not readily obtainable, I make a mixture of clay and some ground or crushed silicious material, preferring nearly equal proportions of each, and adding to the mixture a small percentage of potash, soda, or baryta, or a mixture of two or more of these substances; and if oxide of iron or iron ore is not objectionable, it may be added in any proportion not exceeding one-third of the mass of the other ingredients.

Sixth, where the mixture of lime and magnesia obtained from the calcination of dolomite (magnesian limestone) is cheap and easily obtained, or where magnesia in any form may be economically used, it may be advantageously combined with the other ingredients specified above. Lime and oxide of iron may be omitted, and the mixture may consist simply of clay or silicious material, magnesia or magnesian limestone and alkali or baryta.

Were baryta and strontia to be obtained with sufficient cheapness, they might replace the lime or magnesia in my composition. So, indeed, some metallic oxides might be advantageously used were they readily obtainable.

The essential conditions of my process are: First, that silicic acid be present in such a form as to be readily combinable, preferably in the gelatinous state, but in lieu of that commonly in a state of loose combination as in clay, or in a state of powder. In the state of grit or sand it is useless in my process. Second, there must be present some base or bases with which the silicic acid can readily combine to form an insoluble and stony compound. The most readily obtainable of these I have mentioned in my specifications. Third, there must be present some agent or agents to induce combination, as potash, soda, or baryta, or better than either alone, a mixture of two or more of these agents; I prefer to mix them in equivalent atomic proportions. As these last have little or nothing to do with the composition of stone when complete, and are mostly useful as agents to effect the combination of the other materials, they may be used in comparatively small proportion, except when carbonate of lime or other carbonates are present in considerable amount, or some other cause necessitates an increase in amount used.

In no case do I or can I use sand in its natural state in the formation of my cement. It is in my mixture perfectly inert. Silicious sand crushed to a powder, forming thus crushed silicious material, would be as useful as crushed or ground granite, quartz, or other ground or crushed silicious substance; but in its natural state sand of any kind is perfectly inert and useless in my cement.

I commonly leave my mixtures to solidify exposed to the air, and at the ordinary temperature of the atmosphere. In some instances, and with some materials, however, it is advantageous to submit the mixture to be solidified to the influence of heat or heat and moisture; frequently at high temperatures, but generally for short periods of time. In such instances and with such materials, I employ the means in ordinary use to expose the mass to be petrified to the required degree of heat and moisture. Exposure to heated water or steam is particularly desirable where quick solidification is necessary. When the petrifaction is complete it is often desirable to apply a finishing composition, in order to lessen the porosity of the stone, and to remedy any accidental soft or porous places arising from imperfect mixture or otherwise.

I make a finishing composition by throwing into a barrel of water (preferably hot) from one to three or four quarts of ground marsh-mallow root, and adding lime till the water becomes white, forming what is sometimes termed "milk of lime." The stone is first placed in this solution or mixture, or is washed over with it; afterward it is placed in or washed with a strong solution of alum or sulphate of alumina, saturated or nearly so.

Having thus described my invention, what I claim, and desire to secure by Letters Patent, is—

1. A cement, composed of ingredients above mentioned, prepared in the manner described.

2. The process above described for preparing and treating artificial stone, for the purpose of remedying defects in the mixture, substantially as above specified.

In witness whereof I have hereunto set my hand and seal.

GILBERT S. DEAN. [L. S.]

Witnesses:
J. L. BOONE,
A. BLUTCHLY.